(12) United States Patent
McGowan

(10) Patent No.: US 6,731,634 B1
(45) Date of Patent: May 4, 2004

(54) LOST PACKET REPLACEMENT FOR VOICE APPLICATIONS OVER PACKET NETWORK

(75) Inventor: James William McGowan, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/526,690

(22) Filed: Mar. 15, 2000

(51) Int. Cl.[7] .............................................. H04L 12/28
(52) U.S. Cl. ........................ 370/394; 370/493; 370/506
(58) Field of Search ................................ 370/216, 218, 370/319–321, 324, 349, 394, 395.1, 395.6, 395.61, 468, 493, 503–506, 546, 429, 474, 435

(56) References Cited

U.S. PATENT DOCUMENTS

| | | | |
|---|---|---|---|
| 4,663,748 A | * 5/1987 | Karbowiak et al. | 370/224 |
| 4,742,516 A | * 5/1988 | Yamaguchi | 370/312 |
| 5,222,080 A | * 6/1993 | Wang et al. | 370/422 |
| 5,883,891 A | * 3/1999 | Williams et al. | 370/356 |
| 6,456,615 B1 | * 9/2002 | Kikinis | 370/352 |

OTHER PUBLICATIONS

DaSilva et al., "A Class–Oriented Replacement Technique for Lost Speech Packets", University of Kansas, IEEE 1998, pp. 1098–1105.*

* cited by examiner

*Primary Examiner*—Chi Pham
*Assistant Examiner*—Andrew M. Waxman

(57) ABSTRACT

A method of operating a packet network for carrying voice traffic, wherein the packets carrying voice traffic include voice samples. The method identifies a replacement packet opportunity, creates a replacement packet based on a selected packet, and inserts the replacement packet in the replacement packet opportunity. The replacement packet includes samples based on samples of the selected packet, but in an order that differs from the order of the samples in the selected packet. The method may further comprise identifying another replacement packet opportunity directly following the replacement packet opportunity, creating another replacement packet based on the replacement packet, and inserting the another replacement packet directly after the replacement packet. The another replacement packet differs from the replacement packet.

21 Claims, 4 Drawing Sheets

```
SELECTED PACKET      A B C D E F G H

REPLACEMENT PACKET   D E F G H A B C
```

FIG. 3A

|  | $S_1$ | $S_2$ | $S_3$ | $S_4$ | $S_5$ | $S_6$ | $S_7$ | $S_8$ |
|---|---|---|---|---|---|---|---|---|
| SELECTED PACKET | A | B | C | D | E | F | G | H |
| REPLACEMENT PACKET | H | G | F | E | D | C | B | A |

FIG. 3B

|  | $S_1$ | $S_2$ | $S_3$ | $S_4$ | $S_5$ | $S_6$ | $S_7$ | $S_8$ |
|---|---|---|---|---|---|---|---|---|
| SELECTED PACKET | A | B | C | D | E | F | G | H |
| REPLACEMENT PACKET | E | F | G | H | A | B | C | D |

FIG. 3C

| SELECTED PACKET | A | B | C | D | E | F | G | H |
|---|---|---|---|---|---|---|---|---|
| REPLACEMENT PACKET | D | E | F | G | H | A | B | C |

LOST PACKET REPLACEMENT FOR VOICE APPLICATIONS OVER PACKET NETWORK

BACKGROUND

Digital voice is typically coded as a series of numerical values called samples. In Pulse Code Modulation (PCM) coding, these samples represent the amplitude of the speech signal at a given moment in time. Both data networks based on Internet Protocol (IP) and Asynchronous Transfer Mode (ATM) networks store and transmit voice as collections of samples called packets. A packet is simply a sequential string of samples attached to a header. The header indicates, among other things, an ordinal number of the packet, so packets, and the samples they carry can be correctly ordered at their destination.

Currently, networks that deliver voice, data and video do so by first segmenting the information into multiple packets and transmitting them across the network. Each packet may take an entirely different route through the network. At the receiving end of the transmission, the packets must be reassembled into proper order. For voice applications, packets must be encoded, transmitted, received, and reassembled in real-time. This real-time requirement often means that sophisticated voice coding techniques cannot be performed. Therefore, a need has arisen to develop procedures to handle end-to-end voice communications in real-time with a minimum of processing requirements.

One difficulty with Voice over IP (VoIP) applications is that IP does not guarantee that packets will arrive at the receiving end within any specified period of time, if at all. The receiving end, therefore, must be able to handle the situation where there are packets which have not arrived (or have not been detected) by the time it is necessary to output the information which the packet was expected to provide. Regardless of the cause, any packet which is not available by that time (the time at which it is necessary to output the information) is considered to be lost.

Current Methods of Handling Lost Packets

Many current methods of packet replacement are based on repeating verbatim or by estimation the contents of previous packets, or sections of previous packets. In the simplest case, if packet n+1 is lost, packet n (the preceding packet) is played in its place. More complex algorithms take a waveform or pitch estimate based on some part of the voice signal carried in the preceding packet, and use this to generate a fill packet. For convenience, the example of simply repeating the previous packet will be used throughout the remainder of the application. However, the techniques being introduced can be applied in the more general situations. FIG. 5 shows an example of packet repetition, where both packets n+1 and n+2 are replaced by repeating packet n and n+1, respectively.

In the case where multiple, consecutive packets are lost, packet repetition causes a reverberant or echo sounding distortion. The reason for this is clear: an echo is a noise that is repeated after some delay. By using packet repetition, a small segment of voice signal is being repeated. When a packet is repeated several times, the effect is exacerbated, and can be quite annoying.

The advantage to packet repeating, though, is motivated by the observation that voice signals tend to change little from packet to packet. So, by repeating a packet, a fairly reasonable estimate of the pitch of the lost packet is usually obtained.

SUMMARY OF THE INVENTION

The invention provides for a replacement packet where the replacement packet is based on a selected packet. More particularly, in one aspect the invention provides a method of operating a packet network carrying voice traffic wherein packets carrying voice traffic carry a plurality of voice samples. The method comprising the steps of:

Identifying a replacement packet opportunity,

Creating a replacement packet based on a selected packet where the replacement packet includes samples based on a selected packet but in an order which differs from the order of samples in the selected packet, and Inserting the replacement packet in the replacement packet opportunity.

The selected packet can be potentially any packet which is actually available at the time the replacement packet is created. Since the buffer area which is used to store received packets is usually several packets deep; at the time a replacement packet is created there may well be available for selection both packets preceding the lost packet as well as one or more packets following the lost packet(s). Consequently the replacement packet can be selected as either a preceding or a following packet.

In the event a preceding packet is chosen, the selected packet can be either the directly preceding packet or an even earlier packet.

In another aspect, the invention provides a method of operating a packet network carrying voice traffic, wherein the voice traffic carrying packets include plural voice samples, the method comprising the steps of:

Identifying a sequence of replacement packet of opportunities,

Creating a replacement packet for each said opportunity based on a selected packet where the replacement packet differs from the selected packet, and Inserting each replacement packet in a related replacement packet opportunity.

BRIEF DESCRIPTION OF THE DRAWING

The invention will be further described in the following portions of this specification when taken in conjunction with the attached drawings. Where like reference characters identify identical apparatus and in which;

FIG. 3A illustrates one manner in which a replacement packet can be formed;

FIG. 3B and FIG. 3C illustrate another manner in which a replacement packet may be formed;

DETAILED DESCRIPTION OF PREFERRED EMBODIMENTS

Figure 1:
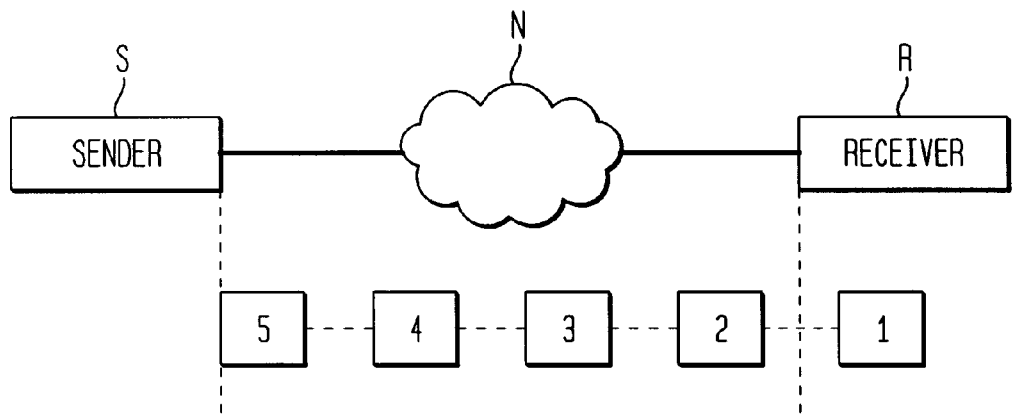
FIG. 1 illustrates a typical network within which the invention can be applied.

FIG. 1 shows a network within which the invention can be applied. As seen in FIG. 1, the network N is connected to a sender S and a receiver R. FIG. 1 also shows (somewhat schematically) a sequence of packets 1–5 which travel from the sender S to the receiver R. At the instant shown in FIG. 1, packet 1 has been received at the receiver R and packets 2, 3, 4 and 5 are in transit through the network N. Those skilled in the art will understand that in a packet network, packets transmitted from a sender S and destined for receiver R would not necessarily travel the same route through the network N. The receiver R typically has a packet assembly area in which received packets are assembled in the appropriate order, e.g., in the sequential order in which they were sent.

In certain applications, such as a voice application, there is a limited amount of time available for processing packets before the information represented by the packets must be output from the receiver R. Thus, although not desirable, it sometimes occurs that a packet fails to appear at the receiver R prior to the time the lost packet and even packets subsequent to the lost packet must be output. For purposes of description, the void created by a lost packet will be termed a "replacement packet opportunity". The invention teaches a simple but effective way of creating replacement packets for insertion in the replacement packet opportunity.

While the preceding text refers to a lost packet, a packet which does not reach the proper address within some limited time, those skilled in the art understand that the need for replacement packets occurs for reasons beyond a lost packet. Packets which actually do reach the intended destination within the appropriate time may be so garbled or truncated that they are effectively unusable. These packets also generate a replacement packet opportunity.

Figure 2:
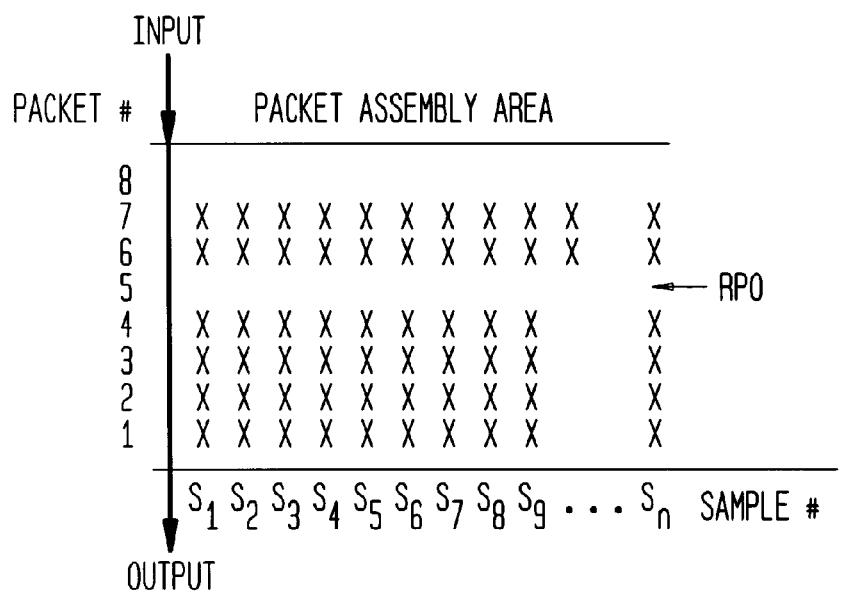
FIG. 2 schematically illustrates the packet assembly area of the receiver R of FIG. 1.

FIG. 2 illustrates a packet assembly area at the receiver R. Shown at the left, packets come in at the top (input) and sequentially move toward the terminal labeled "output". Each packet, illustrated in FIG. 2, has n samples, for ease of reference these are numbered in FIG. 2 $S_1$–$S_n$. FIG. 2 shows that packet positions 1, 2, 3 and 4 are occupied as well as packet positions 6 and 7, but as shown in FIG. 2, packet position 5 is empty. Inasmuch as succeeding packets 6 and 7 have been received at the receiver R but the packet 5 has not been received, packet 5 is a potentially a "lost" packet. Depending upon a variety of parameters, unless packet 5 appears, at some point in time receiver R will declare that packet 5 is lost and thus packet 5 becomes a "Replacement Packet Opportunity (or RPO)". FIG. 3A illustrates 8 samples ($S_1$ through $S_8$) of an exemplary selected packet and a replacement packet. It should be emphasized that the number of samples per packet is only exemplary and the invention can be applied to packets with more or less than 8 samples. FIG. 3A shows how a replacement packet, and its samples, can be based on a selected packet, but yet differ from that selected packet. In particular the selected packet has samples A, B, C, D, E, F, G and H, in that order. As shown in FIG. 3A, the replacement packet has samples H, G, F, E, D, C, B and A, in that order. In other words the order of samples in the replacement packet is the inverse of the order of samples in the selected packet.

For purposes of this description, any sample need not be unique, in other words, while sample A=Sample A, sample A may also be equal to any other sample.

As has been noted, the selected packet, on which a replacement is based, may be the preceding packet and perhaps the directly preceding packet. In these cases the preceding packet may be a more distant preceding packet.

FIG. 3B is another example which illustrates, for the exemplary 8 sample packet, a case where a replacement packet is based on but differs from a selected packet and also differs from the relationship shown in FIG. 3A. For discussion purposes the selected packet in FIG. 3B is identical to the selected packet in FIG. 3A. As shown in FIG. 3B, however, the replacement packet includes samples E, F, G, H, A, B, C, D, in that order. In other words the order of the samples in the replacement packet and the selected packet is the same but the lead sample is different. This is an example of a "phase shift". In the case of FIG. 3B, the phase shift is four, in other words, the sample E (the lead sample in the replacement packet) is offset from the location of sample E in the selected packet by four sample positions. Other replacement packets could be formed from the identical selected packets with more or less phase shift. For example FIG. 3C is still a different replacement packet based on the same selected packet using a different phase shift. In this case the phase shift is three, i.e., the lead sample D is offset from the selected packet by three sample positions.

Figure 4:
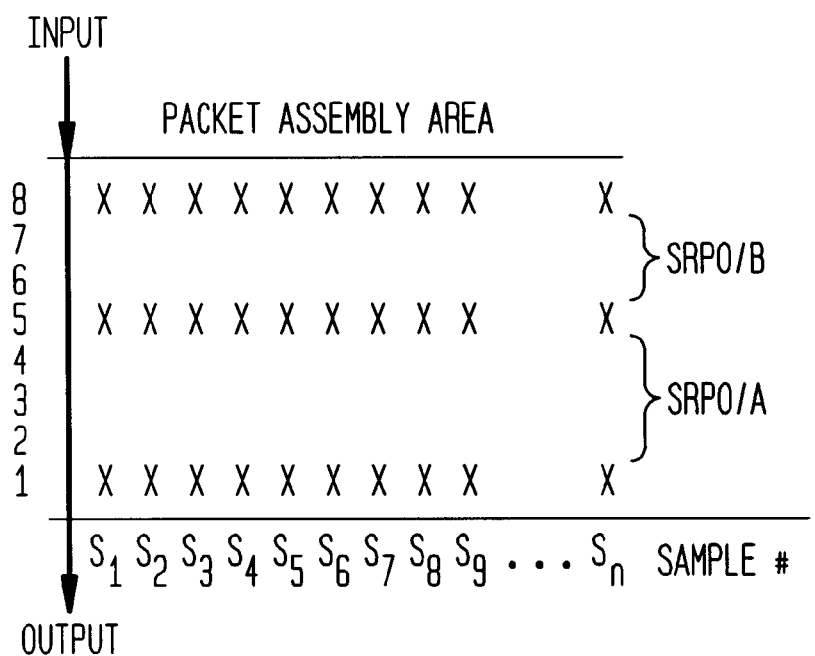
FIG. 4 illustrates a packet assembly area in which a sequential packet replacement opportunity is identified.
Figure 5:
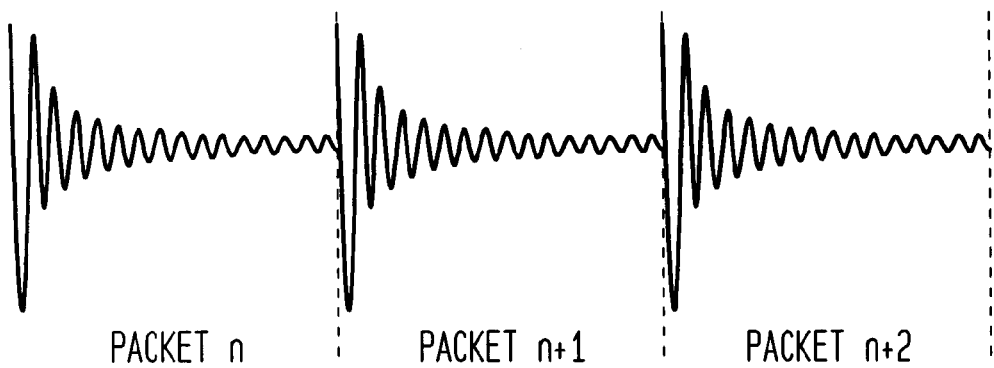
FIG. 5 shows a prior art packet replacement techniques.

Although FIG. 2 shows only a single replacement packet opportunity which is identified in the packet assembly area, the invention can also be applied where there are sequential replacement packet opportunities. FIG. 4 shows the packet assembly area of the receiver R at a different point in time.

At the time shown in FIG. 4, packets 1, 5 and 8 have been received, but packets 2, 3, 4, 6 and 7 have not been received. Accordingly, each of these packets is potentially a "lost" packet. In addition, because the potentially lost packets 2, 3 and 4 are sequential, this is a Sequential Replacement Packet Opportunity SRPO/A. In a similar fashion, the absence of packets 6 and 7 indicates that this is an additional Sequential Replacement Packet Opportunity or SRPO/B. As has been noted the prior art technique of using a preceding packet as the replacement packet produces problems when there is a sequential replacement packet opportunity, and those problems grow as the length of the sequence is increased.

In accordance with the invention, the leading replacement packet opportunity in a sequence of replacement packet opportunities is replaced by the creation of a replacement packet based on a selected packet as has already been described. In one embodiment the initial replacement packet is created based on the directly preceding packet. Since the leading replacement opportunity directly follows a preceding packet which has been received, the same techniques described in connection with FIGS. 3A–3C can be used to create a replacement packet for the leading replacement packet opportunity in a sequence of replacement packet opportunities.

The following replacement packet opportunity in a sequence (packet 3 for example) does not have, at least as received in the receiver R, a preceding packet. Rather the preceding packet—packet 2—is itself a replacement packet. In accordance with the invention the replacement packet, once created is treated as a preceding packet and becomes the basis on which the replacement packet corresponding to packet 3 is created.

Any of the techniques illustrated in FIGS. 3A, 3B and 3C can be employed for creating the replacement packets for sequential replacement packet opportunities. For simplicity purposes, however, the same technique may be applied for the first as well as the succeeding replacement packet opportunities in a sequence.

Figure 6:
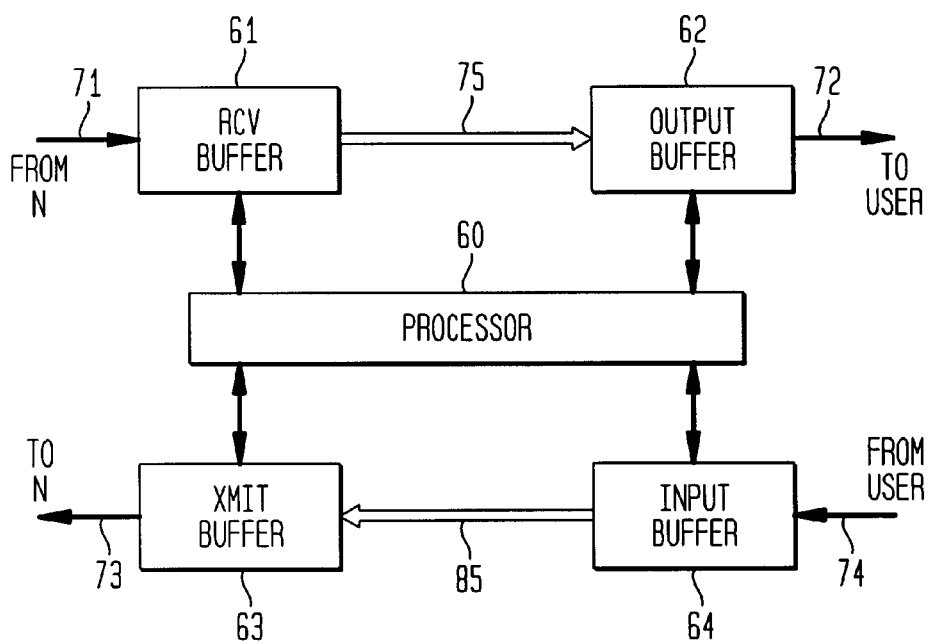
FIG. 6 is a block diagram of a typical Receiver/Sender of FIG. 1.

FIG. 6 illustrates a block diagram suitable for either the sender S or the receiver R of FIG. 1. As shown in FIG. 6, the network N is connected via path 71 to a receive buffer 61. Likewise, the output of the transmit buffer 63 is also connected to the network N via path 73. The receive buffer 61 provides an output 75 to an output buffer 62. Transmit buffer 63 has an input 85 from an input buffer 64. The input buffer 64 has an input from the user, via path 74. The output buffer 62 has an output via path 72 to the user. Processor 60 is connected to control each of the receive buffer 61, output buffer 62, transmit buffer 63 and input buffer 64.

In general voice traffic is originated from a user and travels via the path 74 to the input buffer 64. The processor uses the data in input buffer 64 to create and store packets in the transmit buffer 63. At the appropriate time the packets in the transmit buffer 63 are transmitted to the network N via the path 73.

In the receive function, the receive buffer 61 receives packets from the network N over the path 71. The processor 60 monitors the packets received in the receive buffer 61 and periodically transfers packets from the receive buffer 61 via the output 75 to the output buffer 62.

Figure 7:
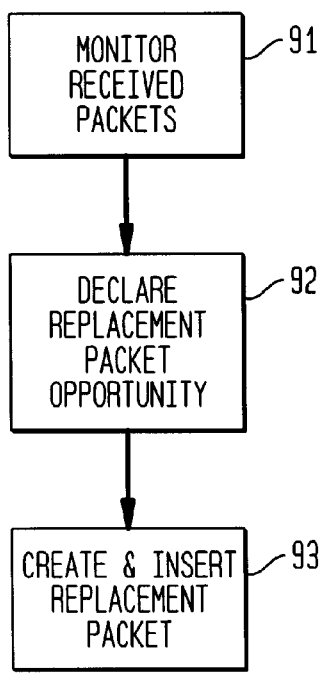
FIG. 7 is a flow diagram showing the functions performed by the processor 60 in order to implement the invention.

FIG. 7 shows some of the functions performed by the processor 60. In particular, the processor 60 monitors received packets 91, particularly the packet received at the receive buffer 61. It is in the receive buffer that the processor 60 can determine that a lost packet has been detected. Thus another functions of the processor 60 is to declare a replacement packet opportunity, function 92. The processor 60 also creates and inserts the replacement packet in the receive buffer 61, function 93.

The manner in which the replacement packets are formed has already been described in connection with the description of FIGS. 2, 3 and 4.

While particular examples of the invention have been described above, it should be understood that the specific examples are not considered to limit the invention which should be construed in accordance with the claims attached hereto.

What is claimed is:

1. A method of operating a packet network carrying voice traffic, wherein packets carrying voice traffic include a plurality of voice samples, the method comprising the steps of:

Identifying a replacement packet opportunity,

Creating a replacement packet based on a selected packet where the replacement packet includes samples based on samples of a selected packet but in an order which differs from the order of samples in the selected packet, and Inserting the replacement packet in the replacement packet opportunity.

2. The method of claim 1 where the selected packet is a preceding packet.

3. A method as in claim 2 when the order of samples in the replacement packet is inverse to the order of samples in the preceding packet.

4. A method as in claim 2 wherein the replacement packet includes at least two groups of samples, each group in an order identical to the order in which the samples appear in the preceding packet.

5. A method as recited in claim 1 which includes the further steps of;

Identifying another replacement packet opportunity directly following a replacement packet opportunity, Creating another replacement packet based on the replacement packet where the another replacement packet differs from the replacement packet, and Inserting the another replacement packet directly after the replacement packet.

6. A method as recited in claim 5 wherein the creating step comprises:

Ordering samples in another replacement packet in an order which differs from the order of samples in the replacement packet.

7. A method as recited in claim 6 wherein the order of samples in the another replacement packet is inverse to the order of samples in the replacement packet.

8. A method as recited in claim 7 wherein the another replacement packet includes at least two groups of samples, each group in an order identical to the order in which the samples appear in the replacement packet.

9. A method of operating a packet network carrying voice traffic, wherein voice traffic carrying packets include plural voice samples, the method comprising the steps of:

Identifying a sequence of replacement packet opportunities,

Creating a replacement packet for each said opportunity based on a selected packet, where the replacement packet differs from the selected packet, and Inserting each replacement packet in a related replacement packet opportunity, wherein the replacement packet is based on a preceding packet, where the replacement packet includes samples based on samples of the preceding packet but in an order which differs from the order of samples in the preceding packet.

10. A method as in claim 9 wherein the order of samples in the replacement packet is inverse of the order of samples in the selected packet.

11. A method as in claim 9 wherein the replacement packet includes at least two groups of samples, each group in an order identical to the order in which these samples appear in the selected packet.

12. An improved packet network carrying voice traffic, wherein packets carrying voice traffic include a plurality of voice samples, the network comprising:

a transmitter for transmitting voice packets, each voice packet having plural voice samples, a packet network supporting transmission of the voice packets, and a receiver for receiving voice packets, the receiver including
   a) means for identifying a replacement packet opportunity,
   b) means for creating a replacement packet based on a selected packet where the replacement packet includes samples based on samples of the selected packet but in an order which differs from the order of samples in the selected packet, and
   c) means for inserting the replacement packet in the replacement packet opportunity.

13. An improved packet network as recited in claim 12 wherein the means for creating produces a replacement packet in which the order of samples in the replacement packet is inverse to the order of samples in the selected packet.

14. An improved packet network as recited in claim 12 wherein the means for creating produces a replacement packet which includes at least two groups of samples, each group in an order identical to the order in which the samples appear in the selected packet.

15. An improved packet network as recited in claim 12 in which the receiver includes means for identifying another replacement packet opportunity directly following a replacement packet opportunity, and wherein the creating means responds to the identification of the another replacement opportunity by producing another replacement packet based on the replacement packet where another replacement packet differs from the replacement packet, and wherein the means for inserting also inserts the another replacement packet directly after the replacement packet.

16. An improved packet network as recited in claim 15 wherein the creating means orders samples in the another replacement packet in an order which differs from the order of samples in the replacement packet.

17. An improved packet network as recited in claim 16 wherein the creating means orders samples in the another replacement packet which is inverse to the order of samples in the replacement packet.

18. An improved packet network as recited in claim 16 in which the creating means produces the another replacement packet which includes at least two groups of samples, each group in an order identical to the order in which the samples appear in the replacement packet.

19. An improved packet network carrying voice traffic, wherein voice traffic carrying packets include plural voice samples, the network comprising:
 a) a transmitter for transmitting voice packets, each voice packet having plural voice samples,
 b) a packet network supporting transmission of the voice packets, and
 c) a receiver for receiving voice packets, the receiver including
  i) means for identifying a sequence of replacement packet opportunities,
  ii) means for creating a replacement packet for each said opportunity based on a selected packet, where the replacement packet differs from the selected packet, and
  iii) means for inserting each replacement packet in a related replacement packet opportunity,
 wherein the means for creating creates a replacement packet based on a preceding packet, where the replacement packet includes samples based on samples of the preceding packet but in an order which differs from the order of samples in the preceding packet.

20. An improved packet network as recited in claim 19 wherein the order of samples in the replacement packet is inverse of the order of samples in the preceding packet.

21. An improved packet network as recited in claim 19 wherein the replacement packet includes at least two groups of samples, each group in an order identical to the order in which these samples appear in the earlier packet.

* * * * *